United States Patent Office 2,762,393
Patented Sept. 11, 1956

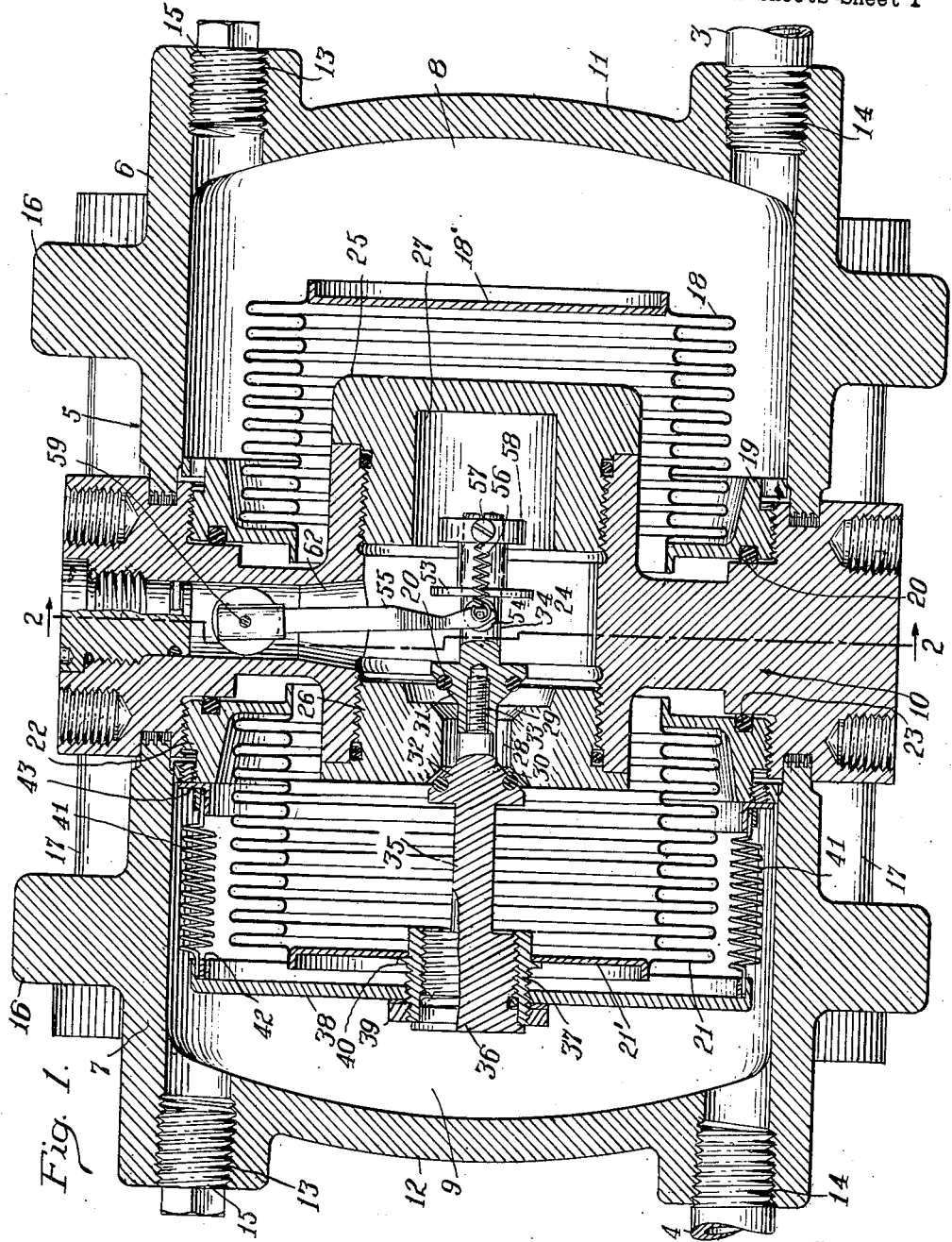

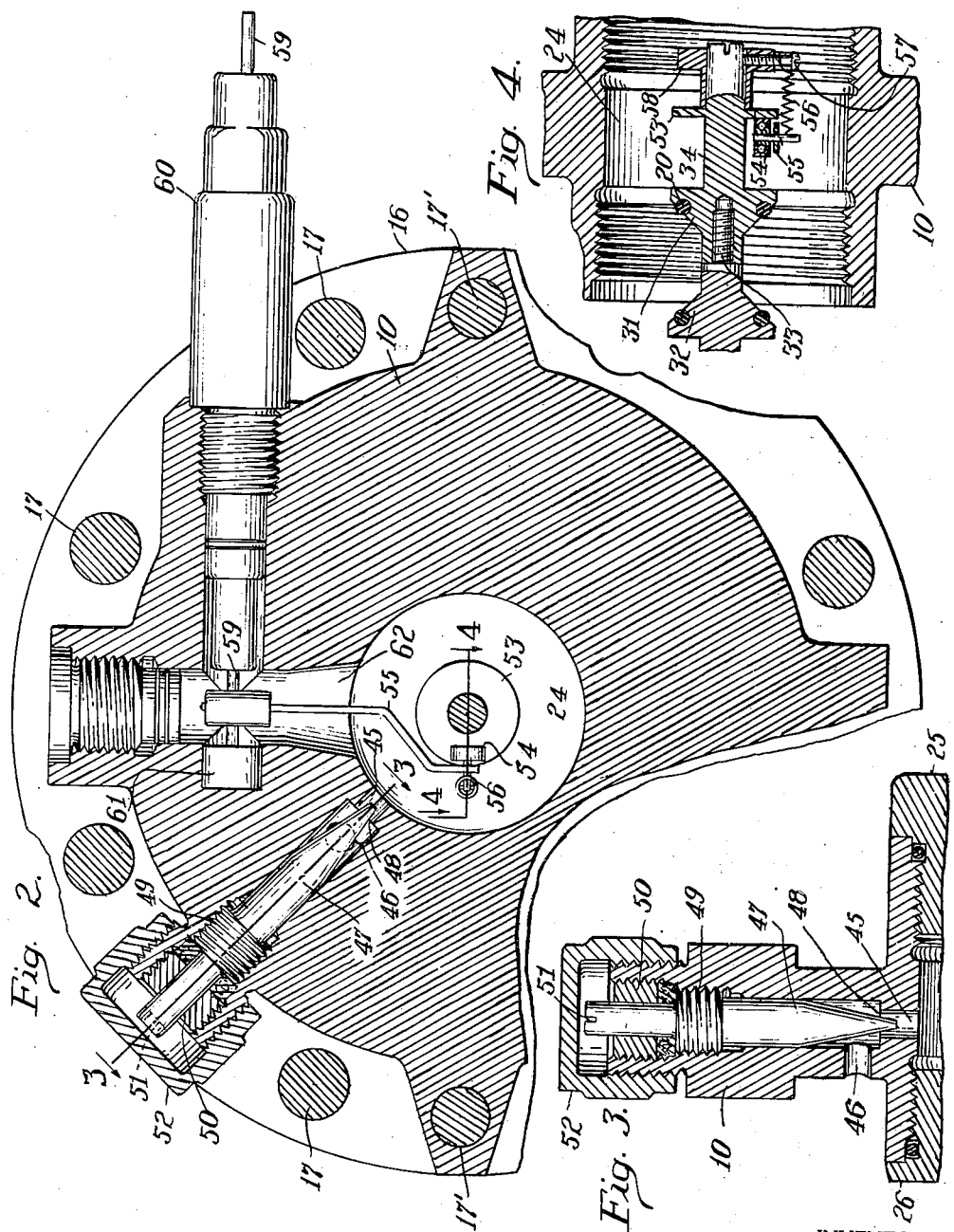

2,762,393
DIFFERENTIAL PRESSURE RESPONSIVE DEVICE

William M. Reese, Odessa, Tex., assignor to Industrial Instrument Corporation, Odessa, Tex., a corporation of Texas Application October 7, 1953, Serial No. 384,608

6 Claims. (Cl. 137—787)

This application is a continuation-in-part of my prior application for Differential Pressure Responsive Devices, Serial No. 323,885, filed December 3, 1952.

This invention relates to differential pressure responsive devices of the character used for measuring pressures in different environments such, for instance, as the drop in pressure through an orifice plate in a flow line, although the device is not limited to such use.

Mercury meters have been used for measuring pressure differentials for many years but were subject to many objections in service. Attempts have been made to replace such mercury meters with bellows type meters and, while the latter overcame some of the difficulties encountered with mercury type meters, the bellows type meters used heretofore were objectionable because of inaccuracy of indication of pressure differentials, difficulty in changing the rate of calibration, complexity and expensiveness of construction, etc.

One object of the invention is to overcome these objections to bellows type differential pressure responsive devices, and to improve the construction thereof to make these practical and accurate in manufacture and use.

Another object of the invention is to provide for increasing the capacity or displacement of the fluid unit, providing for greater calibration travel and eliminating errors due to the pump effect of pulsating pressures.

Still another object of the invention is to provide for a free floating high pressure bellows which will not affect the calibration of the device, but will act as an effective temperature compensator over a wide range. Errors due to sudden pressure surges which may distort the bellows momentarily do not affect the accuracy of the meter recording.

A still further object of the invention is to eliminate errors in the transmission through the torque tube to the pin or indicator mechanism due to hysteresis and fatigue. The manner in which motion is transmitted to the recorder makes it possible for me to record differentials as low as five inches of water, whereas other instruments can be used only for recording differentials as low as twenty inches of water.

Still another object of the invention is to provide an improved dampener for pressure differentials which can be easily and quickly adjusted to secure the desired dampening effect and which will act to control surges of flow from one side to the other of the liquid in the device.

An additional object of the invention is to provide a free floating unit and to eliminate any possible friction drag that may result from the action of the valve means therein.

These objects may be accomplished according to one embodiment of the invention by providing separate bellows located within a housing and connected together through a passageway therebetween controlled by respective high and low pressure valves. The valves are both controlled from the low pressure bellows, free of the high pressure bellows so as not to be moved by the latter. Therefore, the high pressure bellows does not affect the calibration. It acts as an effective temperature compensator over a wider range, and errors due to sudden pressure surges which may distort the bellows momentarily do not affect the accuracy of the meter recording. It is possible to use a larger bellows than has been provided in other devices of this general type which gives greater displacement, thereby increasing the drive power and the total calibrated travel, eliminating errors due to the pump effect of pulsating pressures, especially when the dampener is provided as a by-pass valve.

The construction involves a center housing or plate provided with an opening therethrough for the valve stem of the high and low pressure valves that are connected together and with the low pressure bellows, without connection with the high pressure bellows. Provision is made for proper control without guiding of the stem, to insure accurate movement thereof. Provision is made for a by-pass passage controlled by a pulsation dampener valve which may be adjusted manually from a point externally of the instrument. The construction and assembly of the instrument makes it possible to use a much larger bellows than has been provided heretofore which contains much more sealing fluid, giving greater displacement, which increases the drive power and travel, and thus eliminates errors due to the pump effect of pulsating pressures when the dampener is used.

The valves connected with the low pressure bellows are supported solely at one end of the valve stem and extend freely in the center plate and through the plug cap provided therein without drag or friction in the center plate. This eliminates the difficulties encountered heretofore and allows the valve unit to float entirely free.

This embodiment of the invention is illustrated in the accompanying drawings in which:

Fig. 1 is a longitudinal section through the differential pressure responsive device embodying this invention;

Fig. 2 is a cross section therethrough on the line 2—2 in Fig. 1;

Fig. 3 is a detail cross section through the pulsation dampener valve at right angles to Fig. 2 and taken substantially on the line 3—3 in Fig. 2; and Fig. 4 is a detail horizontal section through the calibration unit on the line 4—4 in Fig. 2.

While the invention is adapted for many uses as a differential pressure responsive device, for measuring, controlling or indicating pressure differentials, one embodiment of the invention is illustrated as a differential flow meter to measure the drop in pressure through an orifice plate in a flow line. A typical gas or liquid flow line is provided with an orifice plate therein. Connected with the flow line on opposite sides of the orifice plate are pipes 3 and 4, respectively, which extend to the differential pressure responsive device constituting this invention, being connected, respectively, with the high and low pressure chambers thereof.

The embodiment of this device which is illustrated in the drawings comprises a housing generally indicated at 5, the construction of which is shown in Fig. 1. The housing 5 includes a high pressure cylinder or body 6 and a corresponding low pressure cylinder or body 7 arranged in axial alignment with each other and enclosing, respectively, high and low pressure chambers 8 and 9. The chambers 8 and 9 are separated from each other by a center plate 10.

The housing cylinder or body 6 is closed at its outer end by a head 11, while the cylinder or body 7 is likewise closed at its outer end by a head 12. The heads 11 and 12 are shown as formed in one integral piece with the cylinders or bodies 6 and 7, respectively, although they may be separate therefrom if desired and secured rigidly thereto. Each of the heads 11 and 12 is provided with tapped connector openings 13 and 14 of the same or different diameters as, for instance, one-quarter inch and one-half inch, respectively. One set of the openings is connected with the pipes 3 and 4, while the other set is closed by plugs 15. Either set of tapped connector openings may be used according to the size of pipes to be connected therewith.

Each of the cylinders or bodies 6 and 7 is provided with oppositely disposed flanges or lugs 16 for connecting together the cylinders or bodies 6 and 7 through cap screws or tie bolts 17. Several such tie bolts may be used as required. Guide posts 17' fixed in lugs on the center plate 10 enter openings in the flanges 16 to aid in alignment of the parts.

Mounted within the high pressure chamber 8 is a bellows 18 closed at its outer end by a plate 18' and exposed externally to the pressure within the high pressure chamber 8. The inner end of the bellows 18 is sealed to a nut 19 screw-threaded into a countersunk portion in the adjacent lateral face of the center plate 10. A sealing ring is shown at 20, preferably an O-ring, which effects a complete sealing from the inside of the bellows 18 around the periphery of the nut 19 into the chamber 8.

Mounted in the low pressure chamber 9 is a bellows 21 closed at its outer end by a plate 21', the periphery of which bellows is exposed to the pressure in the chamber 9. The inner end of the bellows 21 is sealed to a nut 22 screw-threaded into a recessed portion of the center plate 10 and provided with a peripheral seal at 23, corresponding with the connection at 19—20 described above.

The bellows 18 and 21 preferably have substantially equal effective areas and are both exposed externally to the liquid or gas within the chambers 8 and 9. The construction herein set forth provides for the use of larger bellows requiring several times the sealing fluid contained therein, which gives greater displacement with increased drive power. This provides several times the total calibrated travel as compared with other bellows heretofore used in instruments of this general type. The bellows 18 and 21 are filled with a suitable liquid that is adapted to flow back and forth in response to variations in pressure in the chambers 8 and 9.

The center plate 10 is provided with an axial passageway therethrough, formed with a cored out chamber 24. The axial passageway is closed by plugs 25 and 26 at opposite ends thereof, preferably screw-threaded into opposite sides of center plate 10 and sealed thereto. The plug 25 has a recessed inner portion indicated generally at 27 for the purpose of receiving freely therein the adjacent end of the valve unit hereinafter described without frictional engagement therewith. This plug 25 forms a cap over the chamber 24 at the adjacent side of the center plate 10 and closes the chamber 24 against direct open communication with the interior of the high pressure bellows 18.

The plug 26 has a passageway 28 therethrough provided with high and low pressure valve seats 29 and 30, respectively, at opposite ends of said passageway, adapted to be engaged alternately by valves 31 and 32, respectively. The valves 31 and 32 are fixed to each other with their opposed faces spaced apart a distance greater than the distance between the valve seats 29 and 30 so that only one of these valves will engage its seat at a time and both valves may be open at the same time, as illustrated in Fig. 1. O-ring seals may be provided in the faces of the valves 31 and 32 for sealing the valves against the seats 29 and 30, respectively, or any other sealing means desirable may be used for this purpose.

The valves 31 and 32 and detachably secured together by a screw-threaded section 33 connected therebetween. The valve 32 has a stem portion 34 extending in one direction therefrom, while the valve 31 has a stem portion 35 extending in the opposite direction therefrom.

The valve stem 34 is carried by a plug 36 screw-threaded into a sleeve 37 secured rigidly to a plate 38. A lock nut 39 may be used to hold the sleeve 37 securely in the plate. At its inner end, the sleeve 37 is provided with a surrounding flange 40 against which the end plate 21' of the bellows 21 abuts in seated relation therewith.

The plate 38 normally is pressed in an inward direction by calibration tension springs 41 spaced at intervals around the periphery of the low pressure bellows 21. Each of the calibration springs 41 is secured at one end to a peripheral ring connection 42 on the plate 38 and at its opposite end to a similar ring connection 43 secured to the adjacent lateral face of the nut 22 so as to extend parallel with the axis of the bellows 21 and normally tending to contract the latter and to move the valve 32 to a closed or seated position.

The center plate 10 is provided with a by-pass passage from the chamber 24 therein into the high pressure bellows 18, as shown in Figs. 2 and 3. This by-pass passage is formed by a radial passage 45 in the center passage plate 10, open at one end to the chamber 24 and having a lateral outlet 46 into the high pressure bellows 18. These passages 45 and 46 will allow the free circulation of liquid from the chamber 24 which may be in open communication with the low pressure bellows 21 into the high pressure bellows 18.

This communication may be controlled by a pulsation dampener restriction valve 47 which is of the needle type, manually adjustable and adapted to engage a seat 48 intermediate the passages 45 and 46 to control the opening therebetween and communication therethrough. The valve 47 is adjustably mounted at 49 in the plate 10 and is held in place by a nut 50 screw-threaded into a projecting portion of the plate, as shown in Fig. 3. The extreme outer end of the valve 47 may be provided with a screw driver slot 51 or with other suitable means to be engaged for adjustment thereof when desired. A cap 52 closes the outer end of the valve and is removable for access thereto. This valve 47 is adapted to be seated in a predetermined position so as to permit normal flow of liquid from one bellows to the other, but to restrict excessive flow due to greatly increased pressures. The normal flow between the bellows is controlled by the valves 31 and 32, being moved in accordance with the relative pressures in the high and low pressure bellows 18 and 21.

The valve stem section 34 is provided with a disk 53 thereon within the chamber 24 against which a roller 54 bears at one side of the valve stem, as shown in Figs. 2 and 4. The roller 54 is carried by an arm 55 which extends downwardly in the chamber 24 beside the valve stem section 34.

The lower end of the arm 55 has one end of a coiled spring 56 connected therewith, the opposite end of which spring 56 is secured to a screw 57 that is threaded into a tension spring holder, generally indicated at 58, sleeved over the valve stem section 34. The tension spring holder 58 preferably abuts against a face of the disk 53 and is secured on the valve stem section 34 by the screw 57 which also anchors the tension spring 56 at one end.

The arm 55 extends upwardly from the chamber 24 in the center plate 10 and is mounted at its upper end on a shaft 59 that extends through a non-freezing bearing, generally indicated at 60, which may be of the type set forth in my application Serial No. 210,132, filed February 9, 1951, patented July 12, 1955, Patent No. 2,712,968. The end of the shaft 59 is mounted in a bearing 61 on the opposite side of a passageway 62 that extends upward through the center plate 10 from the chamber 24 in which the arm 55 extends. The upper end of the passageway 62 is closed by a sealing plug 63.

From the above description, it will be apparent that this construction has material advantages over bellows type differential pressure responsive devices suggested heretofore, especially in providing for larger bellows which gives greater displacement and eliminates errors due to the pump effect of pulsating pressures when the dampener valve is used, as described herein. Moreover, an important consideration is the fact that the low pressure unit is a free floating unit, thereby eliminating any possible chance of friction drag. The valves are supported entirely by this low pressure unit at one end of the valve stem. The calibration springs 41 afford ample stability for alignment of the over-range valve assembly and drive arm connection.

The plug 36 that connects the valve unit with the calibration springs 41 not only forms an effective and secure connection with the plate 38, but it also acts to effect a secure seal with the low pressure bellows 21 so as to hold the greater part of the fluid in the bellows by the action of the calibration springs 41. These parts are effectively locked together, although permitting of manual adjustment when desired. Moreover, upon disengagement of the lock nut 39, the plate 38 may be removed, together with calibration springs 41, so as to change the meter differential range.

The dampener valve 47 may be adjusted without any adjustment of the over-range valves 31—32 or the drive arm and plate assembly. This dampener valve 47 avoids any pump effect and yet allows flow of just enough fluid from one bellows to the other to avoid over-sensitivity.

The plug cap 25 is bored out at 27 to form a chamber on the inner side thereof to provide a bushing effect on the tension spring holder 58. The spring 56 holds tension on the ball bearing wheel 54 and allows up and down swinging movement of the stem section 34 and disk 53 relative to the wheel 54, avoiding angularity errors in calibration while the valve stem is free to move as a unit in a longitudinal travel. This increases not only the sensitivity but also the accuracy of the instrument.

While the invention has been illustrated and described in one embodiment, it is recognized that variations and changes may be made therein without departing from the invention as set forth in the claims.

I claim:

1. A differential pressure responsive device comprising a housing, a center plate extending transversely in the housing and dividing the housing into separate chambers, a bellows in each chamber and having the inner end thereof secured to the housing and the outer end movable relative to the chamber, said center plate having a chamber enclosed thereby with a passageway from the last-mentioned chamber into one of the bellows, means forming opposed valve seats around said passageway, valves connected with the last-mentioned bellows and in position alternately to engage said seats, a restricted passage providing communication from the chamber in the center plate into the second bellows, and means for regulating the flow through said restricted passage.

2. A differential pressure responsive device comprising a housing, a center plate extending transversely in the housing and dividing the housing into separate chambers, a bellows in each chamber and having the inner end thereof secured to the housing and the outer end movable relative to the chamber, said center plate having a chamber enclosed thereby with a passageway from the last-mentioned chamber into one of the bellows, means forming opposed valve seats around said passageway, valves connected with the last-mentioned bellows and in position alternately to engage said seats, one of said valves being enclosed in the first mentioned bellows and the other valve enclosed in the chamber in the center plate, and means closing said last-mentioned chamber out of direct communication with the other bellows.

3. A differential pressure responsive device comprising a housing, a center plate extending transversely in the housing and dividing the housing into separate chambers, a bellows in each chamber and having the inner end thereof secured to the housing and the outer end thereof movable relative to the chamber, said center plate having a chamber therein, plugs secured to opposite sides of the center plate enclosing the last-mentioned chamber, one of the plugs having a passageway therethrough for communication from one bellows into the center plate chamber and having valve seats at opposite ends of said plug in opposed relation on said passageway, valves arranged in seating relation with said seats, and a valve stem connected with the valves and secured to the last-mentioned bellows, the other plug being imperforate and sealing the center plate chamber out of direct communication with the other bellows.

4. A differential pressure responsive device comprising a housing, a center plate extending transversely in the housing and dividing the housing into separate chambers, a bellows in each chamber and having the inner end thereof secured to the housing and the outer end thereof movable relative to the chamber, said center plate having a chamber therein, plugs secured to opposite sides of the center plate enclosing the last-mentioned chamber, one of the plugs having a passageway therethrough for communication from one bellows into the center plate chamber and having valve seats at opposite ends of said plug in opposed relation on said passageway, valves arranged in seating relation with said seats, a valve stem connected with the valves and secured to the last-mentioned bellows, the other plug closing the center plate chamber out of direct communication with the other bellows and having a recess therein, and a valve stem portion connected with the valves and extending transversely of the center plate chamber and into the recess.

5. A differential pressure responsive device comprising a housing, a center plate extending transversely in the housing and dividing the housing into separate chambers, a bellows in each chamber and having the inner end thereof secured in the housing and the outer end thereof movable relative to the chamber, said center plate having a chamber therein, plugs secured to opposite sides of the center plate enclosing the last-mentioned chamber, one of the plugs having a passageway therethrough for communication from one bellows into the center plate chamber and having valve seats at opposite ends of said plug in opposed relation on said passageway, valves arranged in seating relation with said seats, a valve stem connected with the valves and secured to the last-mentioned bellows, the other plug closing the center plate chamber out of communication with the other bellows and having a recess therein, a valve stem portion connected with the valves and extending transversely of the center plate chamber and into the recess, said valve stem portion having a disk thereon, an indicator arm in bearing relation with the disk in the center plate chamber, a spring connected with the arm normally holding the arm in bearing relation against the disk, and a member removably sleeved over the valve stem portion and secured thereto and to the spring for anchoring said spring thereto.

6. A differential pressure responsive device comprising a housing, a center plate extending transversely in the housing and dividing the housing into separate chambers, a bellows in each chamber and having the inner end thereof secured to the housing and the outer end movable relative to the chamber, said center plate having a chamber therein, plugs closing opposite sides of the last-mentioned chamber at the sides of the center plate, one of the plugs having a passageway therethrough from the center plate chamber into one of the bellows, valve means connected with the last mentioned bellows for closing said passageway, the other plug sealing the last-mentioned chamber out of direct communication with the other bellows, a restricted passage providing communication from the center plate chamber into the last-mentioned bellows, and a valve in said restricted passage for regulating the flow therethrough.

References Cited in the file of this patent

UNITED STATES PATENTS 2,632,474  Jones ---------------- Mar. 24, 1953